Figure 1:
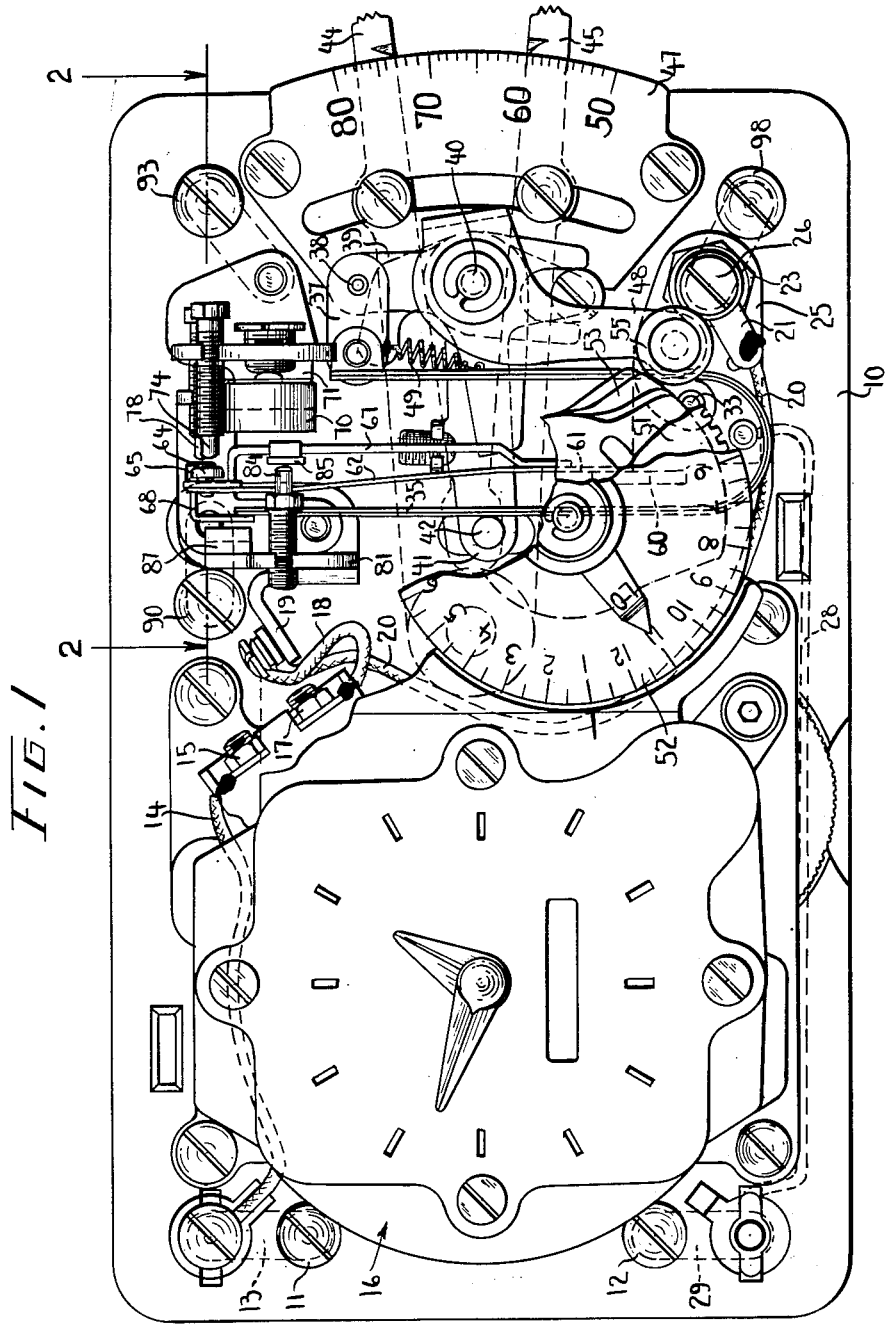

March 24, 1953     W. H. GILLE     2,632,797
THERMOSTAT

Filed Feb. 16, 1949     2 SHEETS—SHEET 1

INVENTOR.
WILLIS H. GILLE
BY George H Fisher
ATTORNEY

March 24, 1953 W. H. GILLE 2,632,797
THERMOSTAT
Filed Feb. 16, 1949 2 SHEETS—SHEET 2
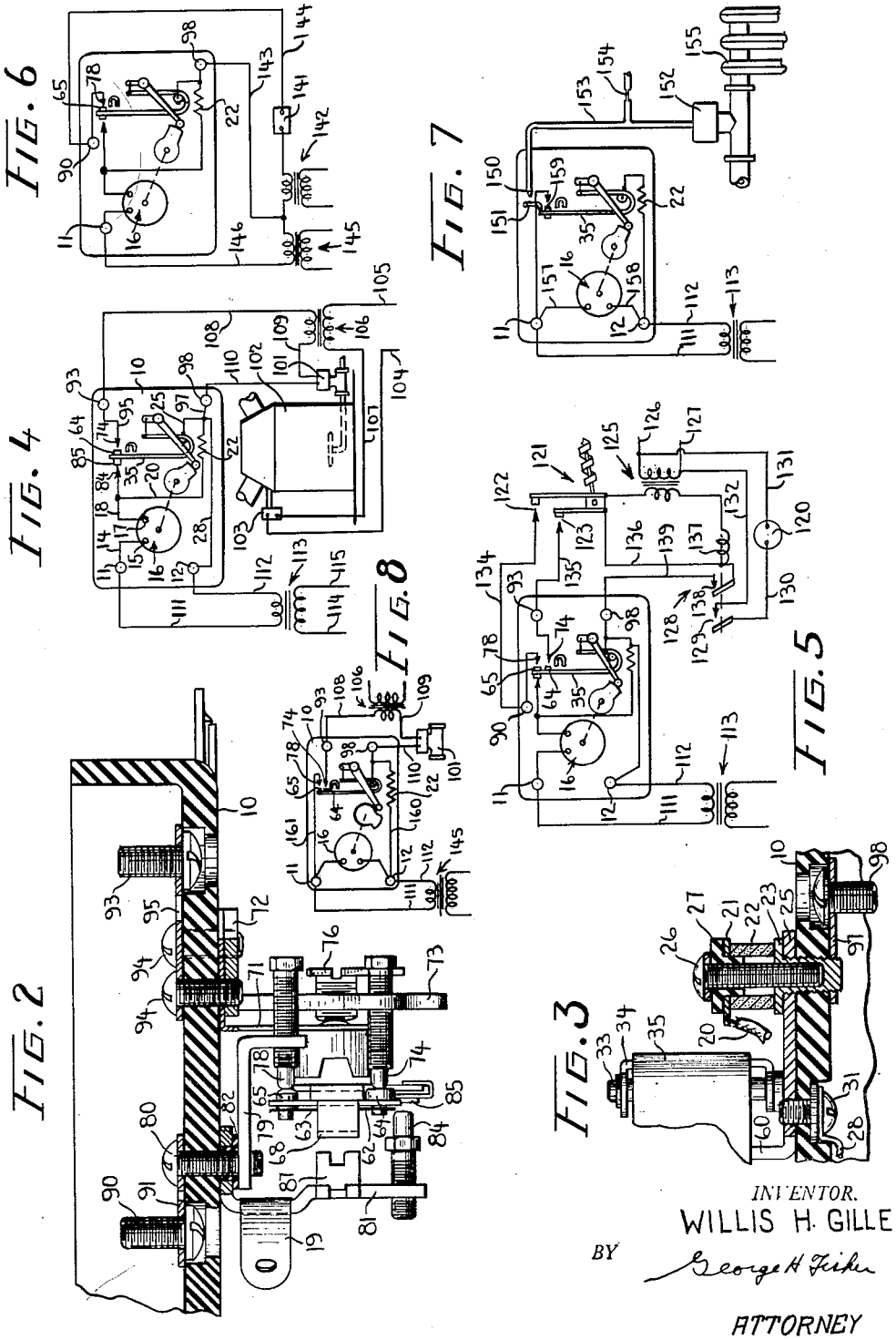
INVENTOR.
WILLIS H. GILLE
BY George H Fiker
ATTORNEY Patented Mar. 24, 1953

2,632,797

UNITED STATES PATENT OFFICE 2,632,797

THERMOSTAT

Willis H. Gille, St. Paul, Minn., assignor to Minneapolis-Honeywell Regulator Company, Minneapolis, Minn., a corporation of Delaware Application February 16, 1949, Serial No. 76,813

8 Claims. (Cl. 175—320)

The present invention relates to thermostats of the type in which artificial heat is supplied to the thermal element when the space under control is being heated for the purpose of anticipating the effect of the heat supply to afford more accurate control.

It is now well recognized that the temperature of a space can be controlled much more closely by a thermostat provided with an anticipating heater than by a thermostat providing on-off control that is not so equipped. Modern thermostats of this type are so constructed as to require a definite differential of temperatures to actuate the controlling means between on and off positions and thereby obtain positive on and off operation of the heating device. If the thermostat is not equipped with an anticipating heater the heating device, once there has been a call for heat, will operate to heat up the furnace or boiler before heat will be supplied to the space and will continue to raise the furnace or boiler temperature while the space is being heated to actuate the thermostat through its operating differential. Then when the thermostat is satisfied, unwanted heat will be supplied to the space before the furnace or boiler cools down. This difficulty is largely eliminated when the thermostat is provided with a heater for supplying artificial heat to the thermal element as soon as the heating cycle begins.

An anticipating heater should be so disposed with respect to the thermal element and of proper resistance so that when energized by the available current it will raise the temperature of the thermal element by an amount slightly more than the amount of the operating differential of the thermostat. The heat supplied by the anticipating thermostat is critical. If too much heat is supplied the control point of the thermostat will be undesirably reduced during cold weather when continued operation of the furnace or boiler is required since the anticipating heater also will be energized a large portion of the time. Also in mild weather, excessive heat supplied by the anticipating heater will result in undesirably short operating periods of the furnace or boiler. If too little artificial heat is supplied to the thermal element the advantages of the anticipating heater are lost in that excessive heat will be supplied to the space being heated after the thermostat is satisfied, and the system will "overshoot" in mild weather.

In the usual thermostat the anticipating heater is connected in series with control contacts and the thermostat is connected in series with a source of power and a primary control such as a gas valve, an oil burner relay, a stoker control or a damper motor. The current drawn by such devices varies over a wide range, even among controls of a certain type. Hence it has been the custom to match the heater to the device being controlled by the thermostat. This requires the services of an expert who must be provided with heaters of various resistances that may be selected and installed in the thermostat as required. Other methods of correlating the heat supplied by the heater and the operating differential of the thermostat are to provide an adjustable heater, to adjust the heat transfer between the heater and the thermal element, or to vary the differential. In each of these methods knowledge of the problem involved is essential in order to obtain optimum results.

It is an object of the present invention to provide an anticipating thermostat that may be connected to control various devices without the necessity of matching the anticipating heater to the current drawn by such a device.

Another object of the invention is to provide a thermostat having an anticipating heater that is energized from a circuit that does not include the device being controlled.

Another object is to provide an electric clock thermostat having an anticipating heater that is energized from the clock circuit and is controlled by a switch actuated by the temperature responsive element.

A further object is to provide a clock thermostat that may be substituted for an existing thermostat without considering the exact value of the current that is to be controlled by the control contacts of the device.

A somewhat broader object is to provide a thermostat having an electrically energized anticipating heater in which the control function may be other than control of an electric circuit.

Other objects will be apparent from the written description and claims and from the drawings, in which Figure 1 is an elevation of a clock thermostat with the cover removed and with certain parts broken away for the sake of clarity;

Figure 2 is a fragmentary section taken substantially on line 2—2 of Figure 1,

Figure 3 is a fragmentary section of a portion of the temperature responsive element and the anticipating heater of the device shown in Figure 1, Figure 4 is a diagrammatic view of the device of Figures 1–3 shown connected in a control system, Figure 5 is a diagrammatic view of the device of Figures 1–3 connected in a system utilizing two control circuits, Figure 6 is another diagrammatic view of the device of Figures 1–3 connected in still another control circuit, Figure 7 is a diagrammatic view of an anticipating thermostat in which the control element is a pilot valve rather than an electric switch, and Figure 8 is a diagrammatic view of another modification.

Control circuits are usually low voltage so that the cost of wiring is greatly reduced and so that light duty switching devices may be employed. Hence the usual line voltage is reduced by a transformer, usually to 20 or 25 volts. Also, to facilitate wiring, the motor of an electric clock thermostat is usually selected to operate at low voltage and a separate transformer is used to supply the clock. While it would be feasible to operate both the control circuit and the clock motor from the same transformer, this is seldom done since many devices controlled by room thermostats are provided with built in transformers that are capable only of supplying enough power for their normal control function and would not supply sufficient voltage if additionally loaded by a clock motor. Also in many installations a line voltage safety device such as a limit control is wired in the supply circuit ahead of the transformer. The clock motor could not be energized from the control circuit transformer in such a system since opening of the limit control would stop the clock.

In Figures 1, 2 and 3 of the drawing a clock thermostat is shown having a base 10 of suitable insulating material which is adapted to be secured to the wall of a room. The base 10 is provided with a pair of terminal screws 11 and 12 that are adapted to be connected to a suitable source of regulated frequency alternating current. Terminal 11 is connected through electrical conductors 13 and 14 to a terminal 15 of a synchronous clock motor 16. The clock motor is not shown in detail as such motors are well known in the electric clock art. The motor 16 is provided with another terminal 17 which is connected by a conductor 18 to a bracket 19. The bracket 19 is connected by a wire 20 to a conducting washer 21 which is held against the top of a cylindrical graphite heater 22 which is shown most clearly in Figure 3. The lower portion of the graphite block 22 rests against the top of a stud 23. The stud 23 lies in electrical conducting relation with a bracket 25 that is suitably secured to the base 10. A screw 26 passes through an insulating washer 27 and into the stud 23 to secure the washer 21 and heater 22 against stud 23. The bracket 25 is connected by conductors 28 and 29 to the terminal screw 12. The conductor 28 is electrically connected to the bracket 25 by a screw 31 which aids in securing the bracket 25 to the base 10. Thus, it will be seen that the clock motor 16 and the heater 22 are electrically connected in series circuit with the terminals 11 and 12.

The bracket 25 carries a pin 33 at right angles to the base 10. A bracket 34 is pivotally mounted on the pin 33 and has a U-shaped bimetal thermostatic element 35 suitably attached thereto. When the heater 22 is energized and is raised to a temperature higher than ambient, heat will flow from the heater through the stud 23, the bracket 25, the pin 33 and the bracket 34 into the bimetal element 35.

The upper end of the right hand leg of the bimetal element 35 as seen in Figure 1 is positioned by a link 37 which is pivoted to the bimetal element and also on a pin 38 carried by an arm 39 of the temperature setting mechanism. This mechanism is described in detail in the application of Carl G. Kronmiller Serial No. 2,230, filed January 14, 1948, and will not be described in detail here. The arm 39 is, in effect, one arm of a bell crank member pivoted on a pin 40 in the base 10, the other arm 41 of which is provided with a pin 42 that extends between a pair of control point adjusting arms 44 and 45. The arms 44 and 45 are pivoted in the base 10 on a suitable friction pivot and cooperate with an indicia plate 47 also secured to the base 10. The pin 42 will be in engagement with one or the other of the arms 44 or 45 depending upon the position of a cam follower arm 48 which is also pivoted on the pin 40. A strain release spring 49 acts between the bell crank and a portion of the arm 48 so that the arms 39, 41 and 48 move as a unit unless the arm 48 is moved farther in a counterclockwise direction than the arm 41 is permitted to move as determined by the position of the setting arm 45.

The clock motor 16 drives a gear 51 which is the last of a series of gears driven by the motor armature. A 24-hour dial 52 is secured to the gear 51 to rotate therewith and a cam 53 is adjustably secured to the gear 51 and the dial 52 to rotate therewith. The extent of the raised portion of the cam 53 as well as its position relative to the dial 52 may be adjusted as described in the aforementioned Kronmiller application. The raised portion of the cam 53 is adapted to engage a roller 55 carried by the end of the arm 48. When the raised portion of the cam 53 engages the roller 55 to move the arm 48 in a counterclockwise direction, the arms 41 and 39, the link 37, and the top end of the right-hand leg of the bimetal element 35 will be positioned as determined by the setting of the temperature setting arm 45. When the cam 53 is rotated so that the roller 55 is off the raised portion of the cam, the pin 42 carried by the arm 41 will be positioned by the temperature setting arm 44, since the bimetal element 35 exerts a clockwise force on the link 37 and arm 39, as will appear below.

The bracket 25 which is secured to the base 10 is provided with an extension 60 to which is secured a flexible strip 61. The upper end of strip 61 is bifurcated to form two separate resilient strips 62 and 63 which carry movable contacts 64 and 65. A switch arm 67 is secured to the strip 61 adjacent the bracket portion 60 but spaced slightly therefrom. The switch arm 67 has an extension 68 that engages the upper end of the left-hand leg of the bimetal element 35. The strip 61 is preshaped so that the portion intermediate the bracket 60 and the switch arm 67 exerts a bias on the arm 67 in a clockwise direction that tends to rotate the bimetal element 35 about the pin 33 in a clockwise direction and to rotate the arms 39 and 41 of the temperature selecting mechanism to bring the pin 42 into engagement with the temperature setting arm 44. Thus, when the roller 55 is opposite the low portion of the cam 53 the assembly will be biased in a clockwise direction by the spring strip 61 toward the limiting position as determined by the arm 44.

The upper portion of the switch arm 67 lies adjacent a magnet 70 which is carried on a spring strip 71 which in turn is secured to the base 10. A bracket 72 overlies the strip 71 and is provided with an upstanding portion 73 which carries the stationary contact 74 adapted to cooperate with the movable contact 64. A screw 76 is adjustable in the bracket portion 73 and engages the back side of the magnet 70 to adjustably position the magnet against the bias of the spring strip 71. The upper end of the switch arm 67 is of magnetic material and acts as an armature to cooperate with the magnet 70. Adjustment of the magnet 70 with respect to the stationary contact 74 serves to determine the operating differential of the switching mechanism. The movable contact 65 is adapted to engage a stationary contact 78 which is carried by a bracket 79 that is secured to the base 10 by a screw 80. For a more detailed description of certain phases of this switching mechanism, reference is made to Kronmiller Patent Re. 22,998 and to Kronmiller application Serial No. 681,461 filed July 5, 1946, now Patent 2,493,294.

The screw 80 also secures a bracket 81 to the base 10, but the bracket 81 is insulated from the bracket 79 by a washer 82. The bracket 81 carries another stationary contact 84 that is adapted to engage a movable contact 85 which is also carried by the switch arm 67. It will be noted that the contacts 84—85 will be in engagement only when the movable contacts 64 and 65 are out of engagement with the stationary contacts 74 and 78. The bracket 81 also carries a magnet 87 that is adapted to cooperate with the extension 68 of the switch arm 67 which is of magnetic material and serves as an armature to assure positive action of the contacts 84—85. The resilience of the bimetal element 35 is relied upon to cooperate with the magnets 70 and 87 to assure that the switch arm 67 will snap between the position in which the contacts 84—85 are in engagement and the position in which the contacts 64 and 65 are in engagement with the stationary contacts 74 and 78.

The stationary contact 78 is connected to a terminal screw 90 on the base 10 by means of the screw 80 and a conducting strip 91. The stationary contact 74 is connected to the terminal strip 93 on the base 10 by means of the bracket portions 73 and 72 and by screws 94 and a conducting strip 95. The switch arm 67 and the movable contacts 64 and 65 are connected by the spring strip 61 to the bracket portion 60 and through the bracket 25 and the stud 23 through a conducting strip 97 to a terminal screw 98.

On a decrease in temperature from the position of the contacts shown in Figure 1, the bimetal element 35 will contract to reduce the distance between its two legs and to cause engagement of the contacts 64 and 65 with the stationary contacts 74 and 78. Thus a reduction in temperature will result in the terminal screws 90, 93 and 98 being interconnected.

Since the heater 22 is connected to the stationary contact 84 through the washer 21, conductor 20, and brackets 19 and 81, and since the other end of the heater 22 is connected to the movable contact 85 through the bracket 25, extension 60 thereof, and switch arm 67, an increase in temperature of the bimetal element 35 will cause engagement of the contacts 84—85 to shunt the heater 22. Under this condition, a clock motor 16 will be energized by a circuit from the terminal 11, conductors 13 and 14, motor terminals 15 and 17, conductor 18, brackets 19 and 81, stationary contact 84, movable contact 85, switch arm 67, brackets 60 and 25, screw 31 and conductors 28, and 29 to terminal 12. Thus it will be seen that when the circuit is broken between the terminal screws 90, 93 and 98 by disengagement of the movable contacts 64 and 65 from stationary contacts 74 and 78 that the heater 22 will not be energized because closure of contacts 84—85 completes a circuit shunting the heater.

Figure 4 shows a typical application of the device described above. The device is shown diagrammatically, and for the sake of clarity the switch arm 67 has been omitted and the movable contacts 64 and 85 are shown as being mounted directly on the bimetal element. Here the device is shown as being in control of a gas valve 101 which controls the flow of gas to a furnace 102 that is adapted to heat the space in which the thermostat is located. The furnace 102 is equipped with a limit switch 103 that is adapted to open a circuit when the temperature in the furnace becomes higher than a preselected safe value. Wires 104 and 105 are connected to a suitable source of power and energize the primary of a step down transformer 106 through the limit switch 103 and a conductor 107. A wire 108 connects one terminal of the secondary of the transformer 106 to the thermostat terminal 93, and the other secondary terminal is connected by a wire 109 to the gas valve 101. A wire 110 connects the other terminal of the gas valve to the thermostat terminal 98. Since the gas valve 101 requires only a single control circuit, it is necessary only to use one of the control circuits available in the thermostat. On a decrease in room temperature the bimetal element 35 will deflect to cause engagement of the contacts 64—74 and disengagement of the contacts 84—85. This will complete a circuit including the secondary of the transformer 106 and the gas valve 101 to open the valve and heat the furnace 102. The thermostat terminals 11 and 12 are connected by wires 111 and 112 to the secondary of a transformer 113 which is energized by line wires 114 and 115. When the thermostat is satisfied and the contacts 84—85 are in engagement the anticipating heater 22 is shunted out of the circuit and the motor 16 is energized through the contacts 84—85. However, when there is a call for heat and the contacts 84—85 are open, the heater 22 is placed in series with the clock motor 16 to supply artificial heat to the bimetal element 35. The resistance of the heater 22 is relatively small compared to the effective resistance of the motor 16 and hence inclusion of the resistor 22 in series with the motor 16 does not reduce the voltage across the motor sufficiently to impair its operation.

Figure 5 is a diagrammatic illustration of a control circuit in which both sets of control contacts of the thermostat are utilized. Here the thermostat is shown in control of a burner motor 120 which effectively supplies heat to a furnace or boiler which in turn supplies heat to the space under control. The furnace or boiler is provided with a limit control 121 of the type which includes two sets of contacts 122 and 123, the arrangement being such that on a rise in temperature the contacts 123 are opened before the contacts 122 in order to provide an operating differential. The control circuit is energized from the secondary of a transformer 125 which is supplied with current by wires 126 and 127. The burner motor 120 is controlled by a relay 128 through relay contacts 129 and wires 130, 131 and 132 which are connected to the supply wires 126 and 127. When the limit control contacts 122 and 123 are closed, the relay 128 and hence the burner motor 120 will be under the control of the bimetal element 35 of the room thermostat. This circuit may be traced from the secondary of the transformer 125 through the limit control contacts 122, a wire 134 to the thermostat terminal 90, the contacts 78—65, contacts 64—74, thermostat terminal 93, a wire 135 to the limit control contacts 123, a wire 136 to the relay winding 137 and back to the secondary of the transformer 125. However, if the thermostat is calling for heat and the furnace becomes overheated the contacts of the limit control 121 will be opened. Opening of the limit control contacts 123 alone will not stop the burner since the relay 128 is provided with holding contacts 138 which are connected by a wire 139 to the terminal 98 of the room thermostat. This holding circuit may be traced from the secondary of the transformer 125 through the limit control contacts 122, wire 134, thermostat contacts 78—65, element 35, thermostat terminal 98, wire 139, relay contacts 138, relay coil 137 and back to the transformer secondary. If the furnace temperature rises sufficiently to open the limit control contacts 122, the relay 128 will be deenergized and it will be necessary for the furnace temperature to drop sufficiently to close limit control contact 123 as well as contacts 122 in order to reenergize the relay. The clock and anticipating heater energizing circuit of Figure 5 is identical to that described in connection with Figure 4.

The thermostat connections as described in connection with Figures 4 and 5 are particularly adapted for use when it is desired to substitute the described clock thermostat for a conventional room thermostat. It is often difficult to provide the additional wires necessary for energization of the clock motor since the connecting wires for the thermostat are customarily concealed within the walls of the room. To avoid the necessity for providing these additional wires, the wires 111 and 112 connecting with the terminals 11 and 12 may conveniently be embodied in a single flexible cord, and the transformer 113 may be attached to the end of the flexible cord and provided with prongs adapted for insertion in an ordinary wall outlet.

Figure 6 shows an arrangement adapted for use when three wires are available for connection to the thermostat. Here a controlled device 141 which may be a gas valve, relay or the like, is energized by the secondary of a transformer 142 under the control of the room thermostat. One side of the secondary of the transformer 142 is connected to the thermostat terminal 90 by the wire 143 and the device 141 is connected to thermostat terminal 90 by a wire 144. Closing of the contacts 65—78 completes the circuit to energize the device 141. It will be appreciated that since a fall in temperature interconnects all three of the thermostat terminals 90, 93 and 98, that the wires 143 and 144 could be connected to any two of these terminals. The clock motor 16 and the anticipating heater 22 are energized from the secondary of a transformer 145 through a wire 146 connected to the thermostat terminal 11 and the wire 143 which is connected to the terminal 98. Since the thermostat terminals 12 and 98 are internally connected it will be apparent that this method of connecting the instrument is the equivalent of the hookups shown in Figure 4. Its advantage lies in cases where a three-wire concealed thermostat cable is already available, and where the device being controlled is adapted for energization by only two wires.

Figure 7 diagrammatically illustrates a modified form of clock thermostat. All of the operating parts of the device may be identical to those described in connection with the instrument illustrated in Figures 1, 2 and 3 with the exception that a pilot valve has been substituted for the control contacts. The pilot valve comprises a nozzle 150 which is adapted to be closed by a pivoted flapper 151 when there is a call for heat. The nozzle 150 is connected to a steam valve 152 by a pipe 153. Air under pressure is supplied through a restriction 154 to both the nozzle 150 and the valve 152. The valve 152 is adapted to open on increased air pressure as supplied by the pipe 153 to permit the flow of steam into a radiator 155. When the flapper 151 is out of engagement with the nozzle 150 air will escape from the nozzle 150 faster than it is supplied through the restriction 154 and the valve 152 will be closed. The clock motor 16 is energized through conductors 157 and 158 which connect the motor directly across the terminals 11 and 12. In addition to actuating the flapper valve the bimetal element 35 also controls contacts 159 which control energization of the anticipating heater 22. It will be seen that when the pilot valve is closed to admit steam to the radiator 155 that the anticipating heater 22 will also be energized. In this modification of the invention, the anticipating heater could be connected in series with the clock motor as in the previously described modification but here there is no additional complication involved in having the contacts which control the heater actuated to closed position when the temperature of the bimetal element is reduced.

Figure 8 shows an arrangement in which the internal wiring of the thermostat is modified somewhat. The operative parts may be as shown in Figures 1, 2 and 3 but no use is made of the contacts 84—85. Here the heater 22 is of relatively high resistance and is connected in parallel with the clock motor 16 while the thermostat is calling for heat. The contacts 64—74 control the source of heat as described in connection with Figure 4. The upper end of the heater 22 is connected by a wire 160 to the terminal screw 11, and the terminal screw 12 is connected by a wire 161 to stationary contact 78 which is engaged by movable contact 65 to complete the heater circuit whenever the control circuit is energized. This heater control arrangement is also adaptable to three-wire control circuits of the type shown in Figure 5, in which case contacts 65—78 would additionally perform a control circuit function.

In view of the above description various modifications of the invention will occur to those skilled in the art. Suitable modification of the device would provide "cold anticipation" desirable when a thermostat is used to control a refrigeration compressor or other source of cold. In that case it is necessary that the anticipating heater be energized when the thermostat is satisfied. The scope of the invention is to be determined only by the appended claims.

I claim as my invention:

1. In a control device, a base, a thermostat including a temperature responsive element and controlling means on said base, a clock mechanism including an electric motor on said base, means actuated by said clock mechanism and influencing said thermostat for adjusting the control point of said thermostat at predetermined times, a pair of terminals on said base constructed and arranged for connection to a source of electric current, an electric heater thermally associated with said temperature responsive element for applying artifical heat thereto, electrical connections between said terminals, said motor and said heater, said connections being arranged to provide continuous operation of said motor, and contacts actuated by said temperature responsive element, said contacts being interposed in said electrical connections for intermittently effecting energization of said heater.

2. In a control device, a base, a thermostat including a temperature responsive element and control means on said base, an electric motor on said base, means actuated by said motor and influencing said thermostat to adjust the control point of said thermostat, a pair of terminals on said base, an electric heater thermally associated with said temperature responsive element for applying artificial heat thereto, electrical connections between said terminals, said motor and said heater, and contacts in said connections actuated by said temperature responsive element controlling energization of said heater, said electrical connections being arranged to provide continuous energization of said motor.

3. In a control device, a base, a thermostat including a thermal element and a control element on said base, a clock mechanism including an electric motor on said base, means actuated by said clock mechanism and influencing said thermostat to adjust said thermostat at predetermined times, an electric heater thermally associated with said thermal element for applying artificial heat to said element, contacts actuated by said thermal element, a pair of terminals on said base, said terminals being adapted for connection to a source of current, and conductors interconnecting said terminals and said clock motor for continuous operation thereof, additional conductors connecting said connections and heater to the clock energizing conductors in such a manner that said contacts control the energization of said heater.

4. In a thermostat, a base, a thermostatic element carried by said base, control means on said base adapted to be actuated by said element, a snap switch adapted to be actuated by said element, a pair of terminals on said base, an electric motor carried on said base, a linkage actuated by said motor for varying the relation between said element, said control means and said switch, an electric heater in heat exchange relation to said element, conductors connecting said motor and heater in series circuit with said terminals, and conductors connecting said switch in parallel circuit with said heater.

5. In a thermostat, a base, a thermostatic element carried by said base, control means on said base adapted to be actuated by said element, a snap switch adapted to be actuated by said element to closed position on an increase in temperature, a pair of terminals on said base, an electric motor carried on said base, a linkage actuated by said motor for varying the relation between said element, said control means and said switch, an electric heater in heat exchange relation to said element, conductors connecting said motor and heater in series circuit with said terminals, and conductors connecting said switch in parallel circuit with said heater.

6. In a thermostat, a base, a thermostatic element carried by said base, a double pole snap switch actuated by said element to close two circuits on temperature fall, a single pole snap switch actuated by said element to close on temperature increase, an electric motor on said base, a linkage connecting said motor and said element for adjusting said element on said base at predetermined times, an electric heater in heat transfer relation to said element, a pair of terminals on said base, conductors connecting said motor and said heater in series circuit with said terminals, and conductors connecting said single pole switch in parallel circuit with said heater.

7. In a thermostat, a base, a thermostatic element carried by said base, a first snap switch actuated by said element to closed position on a decrease in temperature, a second snap switch actuated by said element to closed position on an increase in temperature, a pair of terminals on said base, conductors between said terminals and the contacts of said first switch, an electric motor on said base, a linkage connecting said motor and said element for adjusting said element on said base, an electric heater on said base, a second pair of terminals on said base, conductors connecting said motor and said heater in series circuit with said second pair of terminals, and conductors connecting said second switch in parallel circuit with said heater.

8. In a control device, a base, a thermostat on said base, an electrically energized clock motor on said base, a linkage interconnecting said motor and said thermostat for adjusting the control point of said thermostat at a predetermined time, a resistance in heat exchange relation to said thermostat for supplying artificial heat thereto, a switch actuated by said thermostat, terminals on said base adapted for connection to a source of electric current, and electrical connections between said terminals and said motor for continuous energization thereof, further electrical connections between the first-named electrical connections and said resistance, said further electrical connections including said switch, said switch being arranged to control the energization of said resistance.

WILLIS H. GILLE.

REFERENCES CITED

The following references are of record in the file of this patent:

UNITED STATES PATENTS

| Number | Name | Date |
| --- | --- | --- |
| 1,818,546 | Evans | Aug. 11, 1931 |
| 1,854,786 | Dicke | Apr. 19, 1932 |
| 1,876,636 | Dicke | Sept. 13, 1932 |
| 1,931,464 | Dicke | Oct. 17, 1933 |
| 2,205,164 | Chappell et al. | June 18, 1940 |
| 2,301,383 | Dillman | Nov. 10, 1942 |
| 2,375,234 | Malone et al. | May 8, 1945 |
| 2,376,664 | Crise | May 22, 1945 |